United States Patent Office 3,462,448
Patented Aug. 19, 1969

3,462,448
SUBSTITUTED PHENYL THIAZOLE COMPOUNDS
Jacqueline S. Kelyman, Midland, Mich., assignor to The Dow Chemical Company, Midland, Mich., a corporation of Delaware
No Drawing. Filed Oct. 27, 1966, Ser. No. 589,858
Int. Cl. C07d 91/42, 91/44; A61k 27/00
U.S. Cl. 260—302
3 Claims

ABSTRACT OF THE DISCLOSURE

The present disclosure is directed to substituted phenyl thiazole compounds of the formula

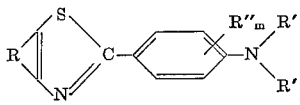

wherein R represents straight chain alkylene being of from 3 to 6, both inclusive, carbon atoms; each R' independently represents hydrogen or loweralkyl; each R" independently represents bromo, chloro, methoxy or methyl; and m represents an integer of from 0 to 2, both inclusive. The preparation of the compounds as well as the use of these compounds as agents for lowering the concentration of cholesterol in blood is also taught.

---

The present invention is directed to a thiazole compound of the formula:

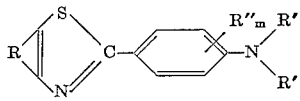

In the above and succeeding formulae, R represents straight-chain alkylene being of from 3 to 6, both inclusive, carbon atoms; each R' independently represents a member selected from the group consisting of hydrogen and loweralkyl; each R" independently represents a member selected from the group consisting of bromo, chloro, methoxy, and methyl; and m represents an integer of from 0 to 2, both inclusive. In the present specification and claims, the term "loweralkyl" is employed to designate alkyl radicals being of from 1 to 4, both inclusive, carbon atoms.

The products of the present invention are typically crystalline solid materials, generally of very low solubility in water and of low to moderate solubility in various organic solvents.

The present products are prepared by the condensation of an alpha-halo ketone of the following formula:

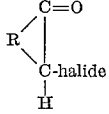

wherein halide is conveniently chloride or bromide, with a para-aminothiobenzamide of the formula:

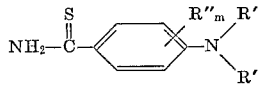

The condensation is affected by reacting the alpha-ketone with the para-aminothiobenzamide in the presence of a suitable salt, typically an alkali metal salt, to serve as hydrogen halide acceptor. The reaction is conveniently carried out in the presence of liquid reaction medium to facilitate the contacting of the reactants. Suitable such media include benzene and, preferably, the alkanols, glycols, and glycol ethers. The reaction consumes the reactants and metal salt in amounts representing equimolecular proportions of each, and the use of such amounts is preferred. The reaction goes forward readily at temperatures from about normal room temperature to the boiling temperature of the reaction medium employed. Preferably, however, the reaction is carried out at temperatures of from 60° to 150° C. The reaction results in the preparation of the desired product and of water and hydrogen halide as byproducts. The hydrogen halide reacts with the metal salt, appearing in the reaction mixture as metal halide.

In carrying out the reaction, the reactants are contacted with one another in the presence of reaction medium and metal salt; conveniently, the contacting is carried out by adding one of the reactants to a reaction mixture comprising the other reactant, the reaction medium, and the metal salt. The reaction goes forward readily, especially when conducted at reflux temperatures, and results in the preparation of the desired product in the reaction mixture. Separation of the product is achieved by employing conventional procedures. Typically, the product appears in the reaction mixture as a coprecipitate with the metal halide byproduct; and the loweralkanol, as well as byproduct water which is soluble therein, is removed from the coprecipitate by evaporation under subatmospheric pressure. The resulting coprecipitate is then washed with water to remove the metal halide byproduct. The resulting product can be further purified, if desired, by conventional procedures, typically recrystallization.

The following example illustrates the present invention, and will enable those skilled in the art to practice the same.

EXAMPLE 1.—2-(p-(DIMETHYLAMINO)PHENYL)-4,5,6,7-TETRAHYDROBENZOTHIAZOLE p-(Dimethylamino)thiobenzamide (20 grams; 0.11 mole), 2-chlorocyclohexanone (20 grams; 0.15 mole), and sodium acetate (9 grams; 0.11 mole) were mixed, with stirring, with 200 milliliters of isoamyl alcohol. The resulting mixture was heated to reflux temperature and maintained at reflux for a period of several hours. Thereafter, the reaction mixture was subjected to evaporation under subatmospheric pressure and the resulting residue washed with water to obtain the desired 2-(p-(dimethylamino)phenyl) - 4,5,6,7 - tetrahydrobenzothiazole product as a residue. This product residue was recrystallized from methanol. The product thus obtained was found to melt at 144–145° C. (softening at 142° C.).

In view of the foregoing teachings and example, those skilled in the art will be enabled to prepare all of the products of the present invention. Other representative products include the following: 2 - (2,5-dichloro-4-(isobutylamino)phenyl) - 4,5,6,7 - tetrahydrobenzothiazole, M.W. of 355.3; 2-(3-methyl-4-(di-n-propylamino)phenyl)-4,5,6,7-tetrahydrobenzothiazole, M.W. of 328.5; 2-(2-bromo - 5 - methoxy-4-(dimethylamino)phenyl)-4,5,6,7-tetrahydrobenzothiazole, M.W. of 367.33; 2-(3,5-dimethyl-4-(dimethylamino)phenyl) - 4,5,6,7 - tetrahydrobenzothiazole, M.W. of 286.5; 2-(3-methyl-4-(dimethylamino)phenyl)-4,5,6,7-tetrahydrobenzothiazole, M.W. of 272.4; 2-(p-(diethylamino)phenyl) - 4,5,6,7,8,9 - hexahydrocyclooctathiazole, M.W. of 314.50; 2-(2-bromo-4-(dimethylamino)phenyl) - 5,6,7,8 - tetrahydro - 4H - cycloheptathiazole, M.W. of 351.33; 2-(3,5-dimethyl-4-(dimethylamino)phenyl)-5,6-dihydro-4H-cyclopentathiazole, M.W. of 272.42; and 2 - (p - (diethylamino)phenyl) - 4,5,6,7 - tetrahydrobenzothiazole, M.W. of 286.4.

The products of the present invention are useful as agents to control the level of cholesterol in the blood of warm-blooded animals such as mice, rats, and dogs. In this application, the products are conveniently administered orally to the animals to be treated. The unmodified products can be administered; alternately, the products can be formulated with a pharmacologically acceptable adjuvant and the resulting composition similarly administered. In representative procedures, 2 - (p - (dimethylamino)phenyl) - 4,5,6,7 - tetrahydrobenzothiazole was added to a standard animal feed at a concentration of 0.125 percent, on a weight basis; this modified feed was then fed as the sole diet, for a period of ten days, to a group of mice. Another group of mice was fed the unmodified standard animal feed for the same period of time. Both groups were maintained, but for diet, under essentially the same conditions during the ten day period. At the end of the ten day period, all of the mice were killed and bled; an aliquot of plasma from each mouse was analyzed for cholesterol, and the values thus obtained averaged for each group. In the treated group, the average cholesterol level was 46.5 milligrams per 100 milliliters of plasma, whereas in the control group, the average cholesterol level was 101 milligrams per 100 milliliters of plasma. Thus, treatment with the subject compound afforded a 53.96 percent reduction in cholesterol level.

I claim:
1. Compound of the formula

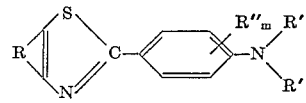

wherein R represents straight-chain alkylene being of from 3 to 6, both inclusive, carbon atoms; each R' independently represents hydrogen or loweralkyl; each R" independently represents bromo, chloro, methoxy, or methyl; and $m$ represents an integer of from 0 to 2, both inclusive.

2. The compound of claim 1 wherein R represents tetramethylene.

3. 2 - (p - (dimethylamino)phenyl)-4,5,6,7-tetrahydrobenzothiazole.

References Cited
UNITED STATES PATENTS
2,882,160   4/1959   De Stevens _____ 260—302

NICHOLAS S. RIZZO, Primary Examiner

R. J. GALLAGHER, Assistant Examiner

U.S. Cl. X.R.
260—558, 586; 424—270